Patented Aug. 13, 1946

2,405,712

UNITED STATES PATENT OFFICE 2,405,712

PRODUCTION OF ALCOHOLATES

William F. Russell, Norwalk, Conn., assignor to R. T. Vanderbilt Company, Incorporated, New York, N. Y., a corporation of New York No Drawing. Application June 26, 1943, Serial No. 492,470

9 Claims. (Cl. 252—42.7)

This invention relates to improvements in the production of alcoholates of the alkaline-earth metals.

Calcium salts of certain complex alcohols have proven valuable addends in the compounding of lubricating oils. The production of such calcium alcoholates, particularly of the purity required for such purposes, however, has proven virtually impossible in the practical sense. Either the methods have been inordinately expensive, or the yields have been prohibitively low, or the product has been obtained only in association with impurities of quality and in quantity impairing its utility, for example, by rendering it less soluble in lubricating oil stocks than required for such purposes.

I have now discovered that the hydroxides and oxides of barium and strontium, unlike those of calcium, react directly with certain aliphatic alcohol groups in high-boiling hydrocarbon media to produce the corresponding alcoholate in high yield, of high purity and thus that the barium and strontium salts can be produced, efficiently and economically, in a simple and direct operation. As lubricating oil addends, such of these salts as are oil-soluble compare favorably with the calcium salts. They are distinguished from the calcium salts, however, in that my invention makes them available in the practical sense.

According to my invention, I react barium hydroxide, for example, directly with a high-boiling alcohol comprising an aliphatic primary alcohol group at a temperature of the order of 200° C. and separate the water of reaction. I find it particularly advantageous to carry out the reaction in a high-boiling petroleum stock, a lubricating oil fraction for example, to produce concentrated solutions of oil-soluble alcoholates in the petroleum stock. After separation of the water of reaction, such concentrates are advantageous compounding materials for incorporating the alcoholates into lubricating oils in the desired proportion. The water of reaction, particularly when the reaction is carried out in a petroleum stock, is advantageously separated by distillation from the reaction product. Unreacted solids, barium carbonate for example, are with advantage separated by filtration. When the reaction is carried out in a high-boiling petroleum stock, filtration is facilitated by dilution of the reaction mixture with a hydrocarbon solvent of lower boiling range, 100°–150° C. for example, and subsequent separation of this solvent by distillation from the filtered reaction mixture. Such a solvent may also be added to the high-boiling petroleum stock before the reaction is initiated, if a hydrous hydroxide is used, to facilitate the separation of water of hydration as distinguished from water of reaction. The same solvent addition may be used both to facilitate such water separation and to facilitate filtration of the reaction product, the solvent then being separated after the filtration. Petroleum naphthas and benzene, for example, are useful solvents.

In this manner, I secure from appropriate alcohols high yields of barium alcoholates of high purity characterized particularly by complete solubility in petroleum lubricating oil stocks.

The method of my invention requires the use of primary alcohols, that is of alcohols comprising an aliphatic primary alcohol group. Secondary alcohols, such as heptadecanol and amylcyclohexanol, do not react in the process. The method of my invention also requires the use of alcohols boiling above the reaction temperature if refluxing of the reaction mixture is to be avoided, that is of alcohols boiling above about 200° C. However, the oil-soluble alcoholates are to be found among the salts of such high-boiling alcohols. The barium salts of diamylphenoxyethanol and of diamylphenoxyethoxyethanol for example are completely soluble in oil. The barium salt of methylisopropylphenoxyethanol is also soluble in oil although less soluble than the alcoholates just mentioned.

The following examples illustrate advantageous embodiments of the method of my invention. It will be noted that in each the alcohol comprising an aliphatic group is reacted directly with the barium hydroxide as such.

Example I 557 grams (2 mols) of diamylphenoxyethanol and 692 grams of a petroleum lubricating oil are charged into a half gallon cast iron retort equipped with a mechanical stirrer and a connection for eduction of water vapor, 172 grams (1 mol) of powdered anhydrous barium hydroxide, $Ba(OH)_2$, are charged into this mixture, the retort is closed and the stirrer is put in operation. The retort is then heated to bring the charge gradually to a temperature of 200°–220° C. and the charge is maintained at that temperature until the reaction is complete. Water liberated by the reaction is driven off as vapor as long as the reaction continues. A period of from 4 to 6 hours is required for completion. Any traces of water may with advantage be swept out by blowing nitrogen gas through the reaction mixture.

After cooling, the contents of the retort, cloudy with traces of insoluble barium compounds, are diluted with an equal volume of a volatile hydrocarbon solvent such as benzene or petroleum naphtha, the diluted reaction product is filtered to remove insoluble solids, and the diluent is distilled from the filtered product under vacuum. A clear brown thick oil is recovered, a solution in about equal parts in the lubricating oil of barium diamylphenoxyethylate, comprising a yield upwards of about 93% of theoretical of the alcoholate.

*Example II*

804 pounds of diamylphenoxyethanol, 1,000 pounds of petroleum lubricating oil, 300 pounds of a petroleum naphtha boiling in the range 100°–150° C. and 506 pounds of hydrous barium hydroxide, $Ba(OH)_2.8H_2O$, are charged into a cast iron retort equipped with a mechanical stirrer and a reflux condenser with a water trap. With the stirrer in operation, the charge is gradually heated, with total reflux of the naphtha, until all of the water of hydration of the hydroxide has been separated in the water trap. The naphtha is then distilled off and the temperature of the charge raised to 200°–220° C. This temperature is then maintained until the water of reaction is driven off and the reaction is complete. Completion can be determined by filtering a sample of the reaction mixture, diluted with benzene, and ashing the filtrate to determine reacted barium as the carbonate. The reaction mixture is then cooled, diluted with about 660 pounds of benzene and filtered, the filtrate is stripped of benzene under vacuum, and about 1 ton of a solution, in about equal parts, of barium diamylphenoxyethylate in the lubricating oil is recovered.

Barium oxide or hydrous barium hydroxide may be used in place of anhydrous barium hydroxide, as in Example I, but when the hydrous material is used appropriate precautions must be taken during evolution of the water of hydration as in Example II. Dehydration of the barium hydroxide as a separate preliminary operation is generally advantageous. Thus, for example, as Example III, 247 pounds of anhydrous barium hydroxide may be substituted for the hydrous material in Example II, the naphtha omitted, and the operation carried out as described without requiring the separation of water of hydration and the distillation of the naphtha involved in that separation. Strontium oxide, anhydrous strontium hydroxide and hydrous strontium hydroxide react similarly to the barium compounds but somewhat more slowly.

The method of my invention is particularly useful for the production of oil-soluble alcoholates. However, it is also useful in the production of oil-insoluble alcoholates of high boiling alcohols comprising an aliphatic primary alcohol group. For example, oil-insoluble alcoholates are produced with dimethylphenoxyethanol, methylphenoxyethanol, octyl alcohol, benzyl alcohol and cetyl alcohol by washing the oil out of the precipitated reaction product, for example with naphtha or benzene, instead of separating insolubles from the oil solution of the reaction product.

The method of my invention is generally applicable to alcohols, simple and complex, comprising an aliphatic primary alcohol group available for reaction as such and it is in this sense that I refer to alcohols comprising an aliphatic primary alcohol group. The ethanol substituent group in the diamylphenoxyethanol of the foregoing examples is such an aliphatic primary alcohol group.

I claim:

1. In the production of hydrocarbon oil concentrates of barium alcoholates, the improvement which comprises reacting barium hydroxide directly with an alcohol comprising an aliphatic primary alcohol group in a high-boiling hydrocarbon medium, the alcohol boiling above the reaction temperature, in a high boiling hydrocarbon medium at a temperature of about 200° C., the alcohol boiling above about 200° C., and separating the water of reaction.

2. In the production of a petroleum oil concentrate of barium diamylphenoxyethylate, the improvement which comprises reacting barium hydroxide directly with diamylphenoxyethanol in a high boiling petroleum stock, at a temperature of 200° to 220° C. distilling off the water of reaction, diluting the reaction product with a volatile hydrocarbon solvent, separating insoluble material from the diluted product and distilling off the solvent from the solution of barium diamylphenoxyethylate in the high-boiling petroleum stock.

3. In the production of a petroleum oil concentrate of strontium diamylphenoxyethylate, the improvement which comprises reacting strontium hydroxide directly with diamylphenoxyethanol in a high boiling petroleum stock, at a temperature of 200° to 220° C. distilling off the water of reaction, diluting the reaction product with a volatile hydrocarbon solvent, separating insoluble material from the diluted product and distilling off the solvent from the solution of strontium diamylphenoxyethylate in the high-boiling petroleum stock.

4. In the production of petroleum oil concentrates of barium alcoholates, the improvement which comprises adding to a high-boiling petroleum stock hydrous barium hydroxide, an alcohol comprising an aliphatic primary alcohol group, and a hydrocarbon solvent of lower boiling range, heating the mixture to drive off the water of hydration and the hydrocarbon solvent, continuing the heating of the mixture to a temperature of about 200° C. to react the barium hydroxide directly with the alcohol, the alcohol boiling above about 200° C., and distilling off the water of reaction.

5. In the production of hydrocarbon oil concentrates of strontium alcoholates, the improvement which comprises reacting strontium hydroxide directly with an alcohol comprising an aliphatic primary alcohol group in a high-boiling hydrocarbon medium at a temperature of about 200° C., the alcohol boiling above about 200° C., and separating the water of reaction.

6. In the production of petroleum oil concentrates of strontium alcoholates, the improvement which comprises adding to a high-boiling petroleum stock hydrous strontium hydroxide, an alcohol comprising an aliphatic primary alcohol group, and a hydrocarbon solvent of lower boiling range, heating the mixture to drive off the water of hydration and the hydrocarbon solvent, continuing the heating of the mixture to a temperature of about 200° C. to react the strontium hydroxide directly with the alcohol, the alcohol boiling above about 200° C., and distilling off the water of reaction.

7. In the production of hydrocarbon oil concentrates of barium and strontium alcoholates, the improvement which comprises reacting a compound of the class consisting of the oxides and hydroxides of barium and strontium directly with an alcohol comprising an aliphatic primary alcohol group in a high-boiling hydrocarbon medium at a temperature of about 200° C., the alcohol boiling above about 200° C., and separating the water of reaction.

8. In the production of petroleum oil concentrates of barium alcoholates, the improvement which comprises reacting barium hydroxide directly with an alcohol comprising an aliphatic primary alcohol group in a high boiling petroleum stock at a temperature of about 200° C., the alcohol boiling above about 200° C., and distilling off the water of reaction, diluting the reaction product with a hydrocarbon solvent and filtering the diluted product, and distilling off the solvent.

9. In the production of petroleum oil concentrates of strontium alcoholates, the improvement which comprises reacting strontium hydroxide directly with an alcohol comprising an aliphatic primary alcohol group in a high boiling petroleum stock at a temperature of about 200° C., the alcohol boiling above about 200° C., and distilling off the water of reaction, diluting the reaction product with a hydrocarbon solvent and filtering the diluted product, and distilling off the solvent.

WILLIAM F. RUSSELL,